(12) United States Patent
Saito et al.

(10) Patent No.: US 7,284,891 B2
(45) Date of Patent: Oct. 23, 2007

(54) LINE ILLUMINATING DEVICE AND IMAGE-SCANNING DEVICE INCORPORATING LINE-ILLUMINATING DEVICE

(75) Inventors: Tomihisa Saito, Osaka (JP); Takashi Kishimoto, Osaka (JP); Hidemitsu Takeuchi, Osaka (JP); Yukihiro Kato, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 32 days.

(21) Appl. No.: 10/532,149

(22) PCT Filed: Oct. 9, 2003

(86) PCT No.: PCT/JP03/12991

§ 371 (c)(1),
(2), (4) Date: Sep. 14, 2005

(87) PCT Pub. No.: WO2004/036899

PCT Pub. Date: Apr. 29, 2004

(65) Prior Publication Data

US 2006/0152942 A1 Jul. 13, 2006

(30) Foreign Application Priority Data

Oct. 21, 2002 (JP) .............................. 2002-306166

(51) Int. Cl.
*F21V 7/04* (2006.01)

(52) U.S. Cl. ...................... 362/615; 362/396; 362/634; 358/474; 358/475; 358/509

(58) Field of Classification Search ................. 362/55, 362/612, 396, 634; 359/831, 599; 358/474, 358/475, 509
See application file for complete search history.

(56) References Cited

U.S. PATENT DOCUMENTS

| 6,017,130 | A | * | 1/2000 | Saito et al. | ................. | 362/223 |
| 6,357,903 | B1 | * | 3/2002 | Furusawa et al. | ........... | 362/555 |
| 6,479,812 | B2 | * | 11/2002 | Tabata | ........................ | 250/239 |

(Continued)

FOREIGN PATENT DOCUMENTS

JP          08-096771          4/1996

(Continued)

*Primary Examiner*—John Anthony Ward
(74) *Attorney, Agent, or Firm*—Carrier, Blackman & Associates, P.C.; Joseph P. Carrier; William D. Blackman

(57) ABSTRACT

A line-illuminating device which is resistant to shrinkage problems caused by repetition of heating and cooling includes a white casing made of polycarbonate or the like, a light guide made of an acrylic resin or the like and accommodated in the casing such that the light-emitting surface thereof is exposed, and light-emitting elements (for example, light-emitting diodes) as a light source provided on both ends of the casing so as to abut against the end surfaces of the light guide without a gap. The casing is divided into two portions in the longitudinal direction, and a gap is formed between the two divided portions. With this gap, even if the light guide shrinks due to repetition of heating and cooling, the divided portions can effectively shrink together with the light guide via the gap, and the abutting state between the end surface of the light guide and the light-emitting element can be maintained.

20 Claims, 4 Drawing Sheets

U.S. PATENT DOCUMENTS

| | | | |
|---|---|---|---|
| 6,563,609 B1 * | 5/2003 | Hattori | 358/475 |
| 6,858,837 B2 * | 2/2005 | Tabata | 250/239 |
| 6,902,309 B2 * | 6/2005 | Uemura et al. | 362/555 |
| 7,224,494 B2 * | 5/2007 | Saitou et al. | 358/474 |

FOREIGN PATENT DOCUMENTS

| | | |
|---|---|---|
| JP | 08-163320 | 6/1996 |
| JP | 10-126581 | 5/1998 |
| JP | 11-136449 | 5/1999 |
| JP | 11-284232 | 10/1999 |
| JP | 2001-343531 | 12/2001 |

* cited by examiner

LINE ILLUMINATING DEVICE AND IMAGE-SCANNING DEVICE INCORPORATING LINE-ILLUMINATING DEVICE

TECHNICAL FIELD

The present invention relates to a line-illuminating device and a contact-type image-scanning device (image sensor) in which the line-illuminating device is incorporated.

BACKGROUND ART

A contact-type image sensor is used as a device for scanning a document in a facsimile machine, a copying machine, an image scanner or the like. The contact-type image sensor is provided with a line-illuminating device for linearly illuminating a document surface along a main scanning field.

In the line-illuminating device, a bar-shaped light guide is accommodated in a casing, light from a light source (LED) is introduced into the bar-shaped light guide, and the light is allowed to reflect within the bar-shaped light guide and be emitted from a light-emitting surface along the longitudinal direction of the bar-shaped light guide toward the document surface, in which the light-emitting surface is exposed from the casing (Patent Documents 1 and 2). There have been known a type in which a light source is provided on one end of the casing, and a type in which light sources are provided on both ends of the casing.

[Patent Document 1] Japanese Patent Application Publication No. 8-163320

[Patent Document 2] Japanese Patent Application Publication No. 10-126581

Among the conventional line-illuminating devices, as for the type in which a light source is provided on one end, the light amount is insufficient, and the illumination intensity is non-uniform along the main scanning direction. Thus, a light-scattering pattern is provided. However, it is still difficult to completely solve the problem of non-uniformity.

In contrast, as for the type in which light sources are provided on both ends, a problem is caused by thermal expansion. Specifically, while the temperature of the contact-type image sensor rises to quite a high temperature at the time of driving, it is cooled to around a room temperature at the time of stopping. The material of the casing is typically polycarbonate, and the material of the light guide is acrylic. Therefore, relative expansion and shrinkage repetitively occur between the casing and the light guide due to the difference in the thermal expansion coefficient. This results in the light guide shrinkage compared to the casing, which causes a gap between the end surface of the light guide and the light source, and part of light generated by the light source unpreferably leaks.

SUMMARY OF THE INVENTION

In order to solve the above-mentioned problems, according to a first aspect of the present invention, light sources are provided on both ends of a casing of a light-illuminating device, and the casing is divided, for example, into two portions in the longitudinal direction.

By providing a gap between the two divided portions of the casing, when the light guide expands or shrinks, the casing correspondingly expands or shrinks, whereby the light source can be kept abut against the end surface of the light guide.

The divided portions may be apart from each other. However, if they are slidably engaged with each other, it is possible to prevent light from leaking from the light guide.

According to a second aspect of the present invention, light sources are provided on both ends of a casing of a light-illuminating device, and the light source is pressed against the end surface of the light guide with an elastic member which is formed integrally with the casing.

In this instance, it is preferable that the end of the light guide be projected from the end of the casing in an estimated amount of shrinkage.

According to a third aspect of the present invention, a light source is attached to one end of a casing of a light-illuminating device in the same manner as the conventional art, and another light source is attached directly to the end surface of the light guide. Incidentally, the light sources may be attached directly to the end surfaces of the light guide on both sides.

As a method for attaching, there is a method in which a raised portion is provided on the end surface of the light guide and the light source is engaged with the raised portion.

DESCRIPTION OF BEST MODES FOR CARRYING OUT THE INVENTION

Figure 1:
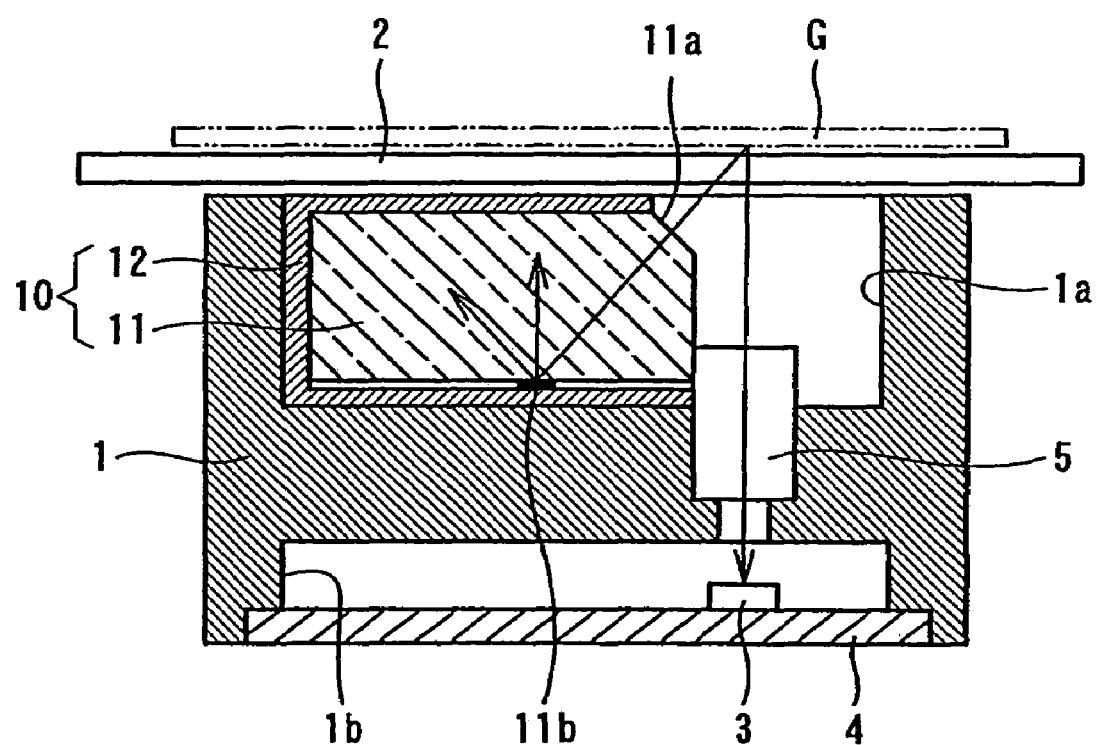
FIG. 1 is a sectional view of an image scanning device in which a line-illuminating device according to the present invention is incorporated.
Figure 3:
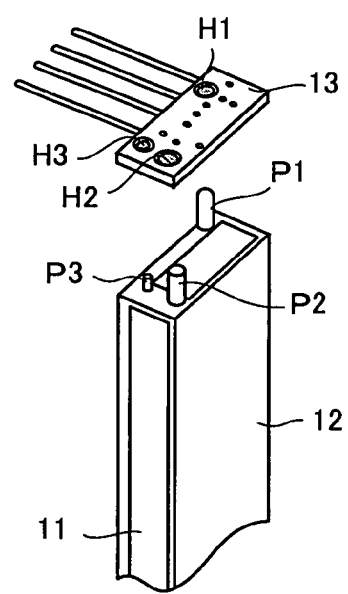
FIG. 3 is an exploded perspective view of one end of the line-illuminating device.
Figure 4:
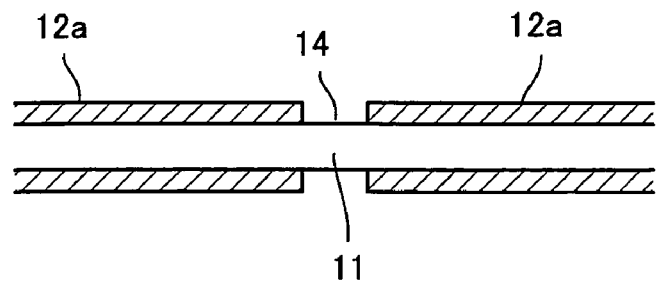
FIG. 4 is a sectional view of the intermediate portion of a casing.

Preferred embodiments of the present invention will now be described with reference to the accompanying drawings. FIG. 1 is a sectional view of an image scanning device in which a line-illuminating device according to the present invention is incorporated, FIG. 2 is a perspective view of the line-illuminating device according to the present invention, FIG. 3 is an exploded perspective view of one end of the line-illuminating device, and FIG. 4 is a sectional view of the intermediate portion of a casing.

As shown in FIG. 1, an image scanning device is comprised of a frame 1 having recessed portions 1a and 1b, a line-illuminating device 10 provided in the recessed portion 1a, a sensor substrate 4 with a photoelectric transducer element (line image sensor) 3 attached to the recessed portion 1b, and a rod lens array 5 for unit magnification imaging which is held within the frame 1. A glass plate 2 is provided above the frame 1. Light emitted from a line-emitting surface 11a of the line-illuminating device 10 is directed to a document G through the glass plate 2, the light reflected on the document G goes to the rod lens array 5 and is detected by the photoelectric transducer element (line image sensor) 3 so as to scan the document G. The frame 1 is moved with respect to the glass plate 2 in a sub-scanning direction, so that a desired area of the document G can be scanned.

Figure 2:
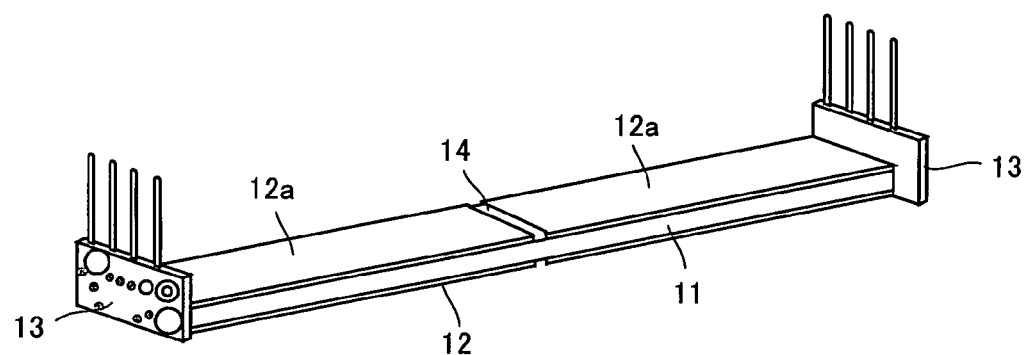
FIG. 2 is a perspective view of the line-illuminating device according to the present invention.

As shown in FIG. 2, the line-illuminating device 10 is comprised of a white casing 12 made of polycarbonate or the like, a light guide 11 made of an acrylic resin or the like and accommodated in the casing 12 such that the light-emitting surface 11a is exposed, and light-emitting elements (for example, light-emitting diodes) 13 as a light source provided on both ends of the casing 12 so as to abut against the end surfaces of the light guide 11 without a gap.

The bottom surface of the light guide 11 is provided with a light scattering pattern 11b for allowing the light emitted from the light source to scatter. The light scattered by the light scattering pattern 11b is emitted from the light-emitting surface 11a.

As shown in FIG. 3, three pins P1, P2, and P3 are formed on the end of the casing 12. The pin P1 and the pin P2 are located in an opposite position with respect to each other, and the pin P1 and the pin P2 have the same diameter. The pin P3 is located adjacent to the pin P1, and the diameter of the pin P3 is smaller than that of the pin P1 and the pin P2.

On the other hand, the light-emitting element 13 is provided with three holes H1, H2, and H3 corresponding to the three pins, respectively. The hole H1 and the hole H2 correspond to the pin P1 and the pin P2, respectively, and the hole H3 corresponds to the pin P3, which means that the diameter of the hole H3 is smaller than that of the other holes and the pin P1 and the pin P2 cannot enter the hole H3. Consequently, coupling of the pin to the wrong hole can be prevented.

As shown in FIG. 4, the casing 12 is divided into two portions in the longitudinal direction, and a gap 14 is formed between the two divided portions 12a. In other words, the casing 12 has a division formed therein which extends along a plane oriented substantially transverse to the longitudinal axis of the casing, as shown in the drawings, to form the two separate portions 12a, 12a, leaving the gap 14 therebetween to accommodate relative expansion and contraction of the casing and light guide. With this gap, even if the light guide 11 shrinks due to repetition of heating and cooling, the divided portions 12a shrink together with the light guide 11, and the abutting state between the end surface of the light guide 11 and the light-emitting element 13 can be maintained.

Figure 5:
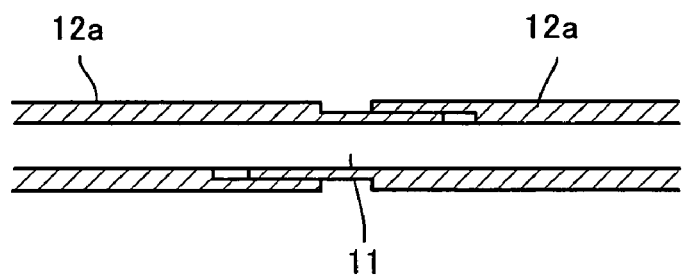
FIG. 5 is a similar view to FIG. 4 showing another embodiment.

FIG. 5 is a similar view to FIG. 4 showing another embodiment. In this embodiment, the left and the right divided portions 12a are engaged with respect to each other so as to prevent the light guide 11 from being exposed. Specifically, the divided portions of the casing include overlapping ends which slide relative to each other in the longitudinal direction of the light guide. In both embodiments shown in FIGS. 4 and 5, an area is defined between the divided portions in which the divided portions may move relative to each other along the light guide.

Figure 6:
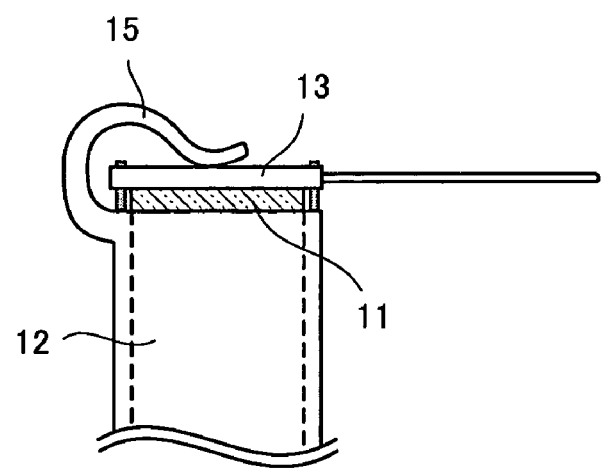
FIG. 6 is a view showing a main part of another embodiment in which an elastic member is provided in the casing.

In another embodiment shown in FIG. 6 using a unique attachment structure of the light-emitting element 13, the end surface of the light guide 11 and the light-emitting element 13 can be prevented from being separated due to the difference in the thermal expansion coefficient. Specifically, an elastic member 15 is formed integrally with the end of the casing 12, so that the light-emitting element 13 can be pressed against the end surface of the light guide 11.

In this embodiment, the light guide 11 is projected from the end of the casing 12 in an estimated amount (t) of shrinkage of the light guide 11.

Figure 7:
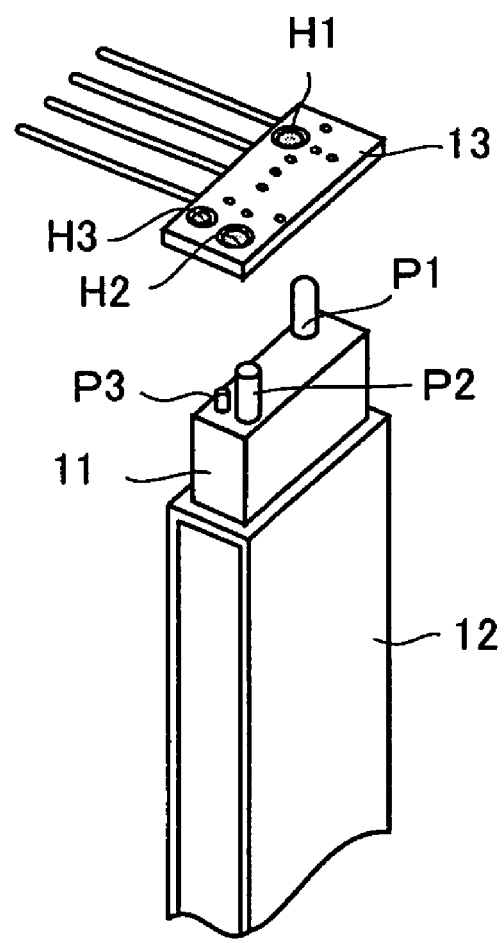
FIG. 7 is a view showing a main part of another embodiment in which a light-emitting element is attached directly to the light guide.

In another embodiment shown in FIG. 7, a modified attachment structure of the light-emitting element 13 is used. In this embodiment, no pin is provided in the casing 12. Instead, the pins P1, P2 and P3 are provided in the light guide 11, receiving holes H1, H2 and H3 are provided in the light emitting element and adapted to receive pins P1-P3, and the light-emitting element 13 is attached directly to the end surface of the light guide 11 by placing the light-emitting element onto the light guide with the pins P1-P3 fitted in the holes H1-H3, respectively, similar to the arrangement shown in FIG. 3 where the pins P1-P3 are formed on the end surface of the casing 12. In these embodiments shown in FIGS. 6 and 7, the above-mentioned attachment structure may be used only on one end of the light-illuminating device, and a conventional attachment structure may be used on the other end.

INDUSTRIAL APPLICABILITY

As mentioned above, according to the present invention, in the line-illuminating device comprising the casing and the light guide which are made of a different material, since the casing is divided into two portions in the longitudinal direction, the light-emitting element is pressed against the end surface of the light guide with the elastic member all the time, or the light-emitting element is attached directly to the end surface of the light guide, even if heating and cooling are repeated a plurality of times and the light guide shrinks compared to the casing, the abutting state between the light-emitting element and the end surface of the light guide can be maintained and light can be introduced into the light guide effectively.

Although there have been described what are the present embodiments of the invention, it will be understood that variations and modifications may be made thereto within the spirit and scope of the invention as set forth in the appended claims.

The invention claimed is:

1. A light-illuminating device comprising:
   a casing;
   a transparent light guide accommodated in the casing; and
   light sources provided on both ends, in a longitudinal direction of the casing,
   in which light from the light sources is introduced into the light guide, the light is reflected within the light guide and introduced in the longitudinal direction, and is allowed to be emitted from a light-emitting surface of the light guide along the longitudinal direction,
   wherein the light sources are attached to the casing, and the casing is divided into portions by a division formed therein which extends along a plane oriented substantially transverse to a longitudinal axis of the casing.

2. The line-illuminating device according to claim 1, wherein the divided portions of the casing are slidably engaged with each other.

3. An image scanning device comprising:
   a frame;
   the line-illuminating device according to claim 2;
   a line image sensor; and
   a rod lens array for focusing reflected or transmitted light from a document on the line image sensor,
   in which the line-illuminating device, the line image sensor, and the rod lens array are incorporated in the frame.

4. An image scanning device comprising:
   a frame;
   the line-illuminating device according to claim 1;

a line image sensor; and a rod lens array for focusing reflected or transmitted light from a document on the line image sensor, in which the line-illuminating device, the line image sensor, and the rod lens array are incorporated in the frame.

5. The line-illuminating device according to claim 1, wherein the light sources abut against end surfaces of said light guide without gaps.

6. The line-illuminating device according to claim 1, wherein the casing and the light guide are formed of different materials, and the material of which the light guide is formed shrinks more with repeated thermal expansion and contraction than does the material of which the casing is formed.

7. The line-illuminating device according to claim 1, wherein an area is defined between the divided portions in which the divided portions are movable relative to each other along the light guide in the longitudinal direction of the light guide.

8. The line-illuminating device according to claim 1, wherein a gap is defined between adjacent portions of the casing exposing a portion of the light guide.

9. The line-illuminating device according to claim 1, wherein the divided portions of the casing include overlapping ends which slide relative to each other in the longitudinal direction of the light guide.

10. A light-illuminating device comprising:

an assembly of a casing and a transparent light guide accommodated in the casing; and light sources provided on both ends, in the longitudinal direction of the assembly, in which light from the light sources is introduced into the light guide, the light is reflected within the light guide and introduced in the longitudinal direction, and is allowed to be emitted from a light-emitting surface of the light guide along the longitudinal direction, and wherein at least one of the light sources is pressed against an end surface of the light guide with an elastic member which is formed integrally with the casing.

11. An image scanning device comprising:

a frame;

the line-illuminating device according to claim 10;

a line image sensor; and a rod lens array for focusing reflected or transmitted light from a document on the line image sensor, in which the line-illuminating device, the line image sensor, and the rod lens array are incorporated in the frame.

12. The line-illuminating device according to claim 10, wherein the casing and the light guide are formed of different materials, and the material of which the light guide is formed shrinks more with repeated thermal expansion and contraction than does the material of which the casing is formed.

13. The line-illuminating device according to claim 10, wherein the elastic member is an elastic arm which presses the light source towards the light guide.

14. The line-illuminating device according to claim 13, wherein the light source is disposed between an end of the light guide and the elastic arm.

15. A light-illuminating device comprising:

an assembly of a casing and a transparent light guide accommodated in the casing; and light sources provided on both ends, in the longitudinal direction of the assembly, in which light from the light sources is introduced into the light guide, the light is reflected within the light guide and introduced in the longitudinal direction, and is allowed to be emitted from a light-emitting surface of the light guide along the longitudinal direction, and wherein at least one of the light sources is attached directly to an end surface of the light guide.

16. An image scanning device comprising:

a frame;

the line-illuminating device according to claim 15;

a line image sensor; and a rod lens array for focusing reflected or transmitted light from a document on the line image sensor, in which the line-illuminating device, the line image sensor, and the rod lens array are incorporated in the frame.

17. The line-illuminating device according to claim 15, wherein the casing and the light guide are formed of different materials, and the material of which the light guide is formed shrinks more with repeated thermal expansion and contraction than does the material of which the casing is formed.

18. The line-illuminating device according to claim 15, wherein the end surface of the light guide has at least one member projecting therefrom, said at least one of the light sources has at least one hole defined therein which is adapted to receive said projecting member therein, and said at least one of the light sources is attached directly to the end surface of the light guide by placing the light source onto the end of the light guide with the projecting member fitted in the hole.

19. The line-illuminating device according to claim 15, wherein the end surface of the light guide has plural members projecting therefrom, said at least one of the light sources has holes defined therein which are adapted to receive said projecting members therein, and said at least one of the light sources is attached directly to the end surface of the light guide by placing the light source onto the end of the light guide with the projecting members fitted in the holes, respectively.

20. The line-illuminating device according to claim 19, wherein the projecting members extend in a longitudinal direction of the light guide.

* * * * *

UNITED STATES PATENT AND TRADEMARK OFFICE
CERTIFICATE OF CORRECTION

PATENT NO. : 7,284,891 B2
APPLICATION NO. : 10/532149
DATED : October 23, 2007
INVENTOR(S) : Saito et al.

It is certified that error appears in the above-identified patent and that said Letters Patent is hereby corrected as shown below:

On the title page:
In the title (54), line 1, change "LINE ILLUMINATING DEVICE AND" to --LINE-ILLUMINATING DEVICE AND--.

Column 1:
Line 1, change "LINE ILLUMINATING DEVICE AND" to --LINE-ILLUMINATING DEVICE AND--.
Line 27, change "There have been" to --There has been--.
Line 53, change "part of light" to --part of the light--.
Line 60, change "light-illuminating" to --line-illuminating--.

Column 2:
Line 6, change "light-illuminating" to --line-illuminating--.
Line 13, change "casing of a light-" to --casing of a line- --.
Line 25, change "image scanning device" to --image-scanning device--.
Line 48, change "image scanning device" to --image-scanning device--.
Line 55, change "image scanning device" to --image-scanning device--.
Line 62, change "Light emitted from a line-" to --Light emitted from a light- --.

Column 3:
Line 13, change "light scattering pattern" to --light-scattering pattern--.
Line 15, change "light scattering pattern" to --light-scattering pattern--.

Column 4:
Line 6, change "light emitting element" to --light-emitting element--.
Line 15, change "light-illuminating device" to --line-illuminating device--.
Line 39, change "light-illuminating device" to --line-illuminating device--.
Line 56, change "image scanning device" to --image-scanning device--.
Line 65, change "image scanning device" to --image-scanning device--.

Column 5:
Line 41, change "image scanning device" to --image-scanning device--.

UNITED STATES PATENT AND TRADEMARK OFFICE
CERTIFICATE OF CORRECTION

PATENT NO. : 7,284,891 B2
APPLICATION NO. : 10/532149
DATED : October 23, 2007
INVENTOR(S) : Saito et al.

It is certified that error appears in the above-identified patent and that said Letters Patent is hereby corrected as shown below:

<u>Column 6</u>:
    Line 7, change "light-illuminating device" to --line-illuminating device--.
    Line 19, change "image scanning device" to --image-scanning device--.

Signed and Sealed this

Twenty-seventh Day of May, 2008

JON W. DUDAS
*Director of the United States Patent and Trademark Office*